Dec. 1, 1959 T. L. FAWICK 2,915,148
CYLINDER-AND-PISTON ASSEMBLY AND BRAKING
MECHANISM COMPRISING SAME
Filed Jan. 30, 1956 2 Sheets-Sheet 1

INVENTOR.
THOMAS L. FAWICK
BY Willard D. Eakin
ATTORNEY

Dec. 1, 1959  
T. L. FAWICK  
2,915,148  
CYLINDER-AND-PISTON ASSEMBLY AND BRAKING  
MECHANISM COMPRISING SAME  
Filed Jan. 30, 1956  
2 Sheets-Sheet 2
FIG. 3
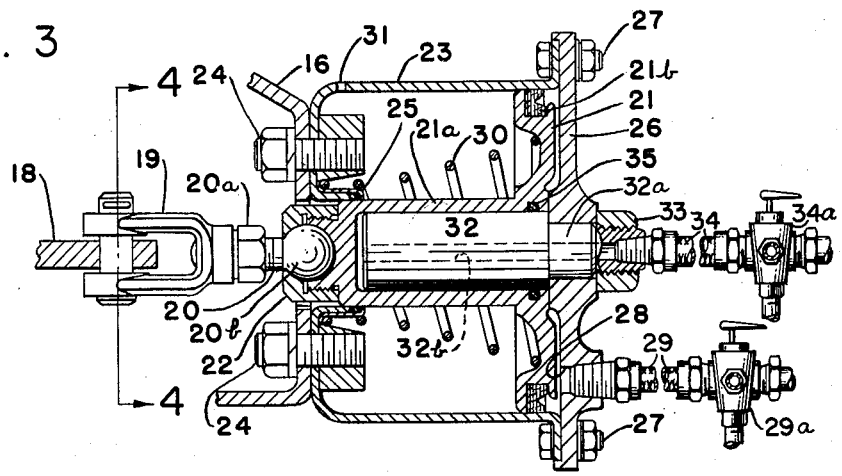
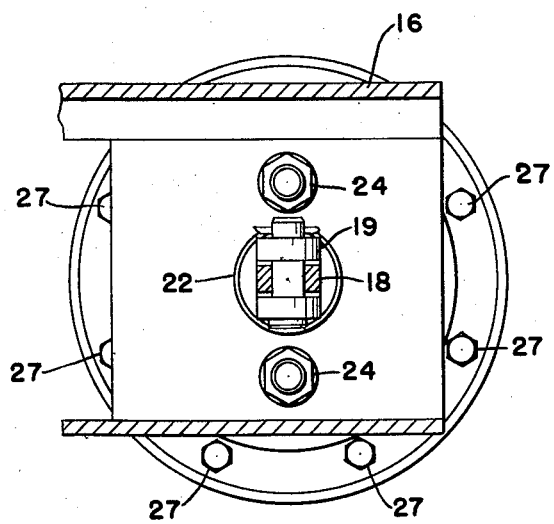
FIG. 4
INVENTOR.  
THOMAS L. FAWICK  
BY Willard D. Eakin  
ATTORNEY

United States Patent Office 2,915,148
Patented Dec. 1, 1959

2,915,148

CYLINDER-AND-PISTON ASSEMBLY AND BRAKING MECHANISM COMPRISING SAME

Thomas L. Fawick, Cleveland, Ohio, assignor to Fawick Corporation, Cleveland, Ohio, a corporation of Michigan Application January 30, 1956, Serial No. 562,193

4 Claims. (Cl. 188—152)

This invention relates to a cylinder-and-piston assembly having provision for alternative low-pressure and high-pressure actuation, or normal actuation and emergency actuation, the assembly being especially advantageous as a part of a vehicle or other braking mechanism, and to a braking mechanism comprising such an assembly.

Its chief objects are to provide simplicity and economy of structure and compactness in such devices and to provide dependability and durability of structure.

Of the accompanying drawings:

Fig. 3 is a section on line 3—3 of Fig. 2.

Fig. 4 is a section on line 4—4 of Fig. 3.

Figure 1:
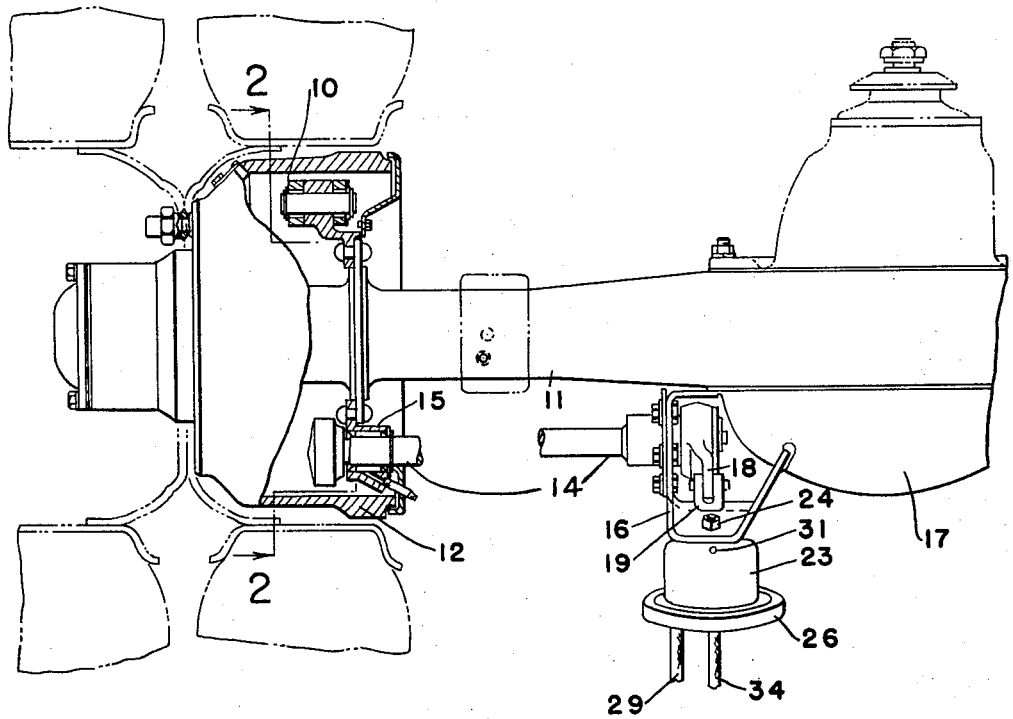
Fig. 1 is a fragmentary plan view, with parts broken away and parts in section, of a rear-axle, brake and wheel assembly of an automobile, said assembly embodying the invention in its preferred form.
Figure 2:
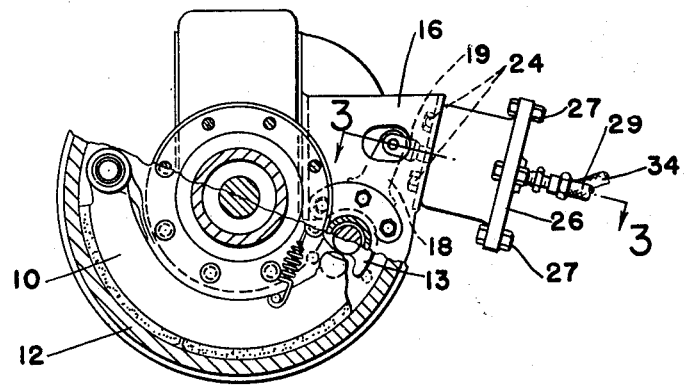
Fig. 2 is a section on the indirect line 2—2 of Fig. 1, with parts shown in elevation.

Referring to the drawings, the cylinder-and-piston assembly is shown as applied to an otherwise conventional braking system comprising the usual pair of brake shoes 10—10, Figs. 1 and 2, hinged upon the axle-housing 11 and adapted to be urged in opposite directions, against the brake-drum 12, by the usual cam head 13, the cam head being secured upon a rock-shaft 14 journaled in a bracket 15 and a U-bracket 16 mounted upon the axle housing.

The rock-shaft 14 has secured upon its inner end, near the differential-gear housing 17, a rock-arm 18 hinged in the arms of a clevis 19 having a stem comprising a member 20 adjustably threaded at one of its ends into the base of the clevis and provided with a lock-nut 20$^a$, Fig. 3, and at its other end formed with a spherical head 20$^b$ to serve as the ball of a ball-and-socket universal joint. The socket element of the joint is provided by the hollow-stem 21$^a$ of a primary piston 21, said stem being formed with a hemispherical seat for the ball, and a retaining ring 22 threaded onto a reduced end portion of the piston-stem 21$^a$. The clevis 19 and its stem 20, 20$^a$, 20$^b$ provide a link connection of the rocker-arm 18 with the piston stem 21$^a$.

A primary cylinder 23 for the primary piston 21 is secured to the bracket 16 by bolts 24, 24, the adjacent wall of the bracket 16 is formed with a center guide hole to permit passage therethrough of the piston-stem 21$^a$, and a dirt-excluding device 25, Fig. 3, is interposed between the said stem and the stem-guiding wall of the cylinder 23.

At its outer end the primary cylinder 23 is provided with a cylinder-head 26 secured to it by bolts 27, 27, and the cylinder-head is formed with an inlet-outlet opening which is coupled to a flexible pipe or hose 29 leading to it from the usual three-way control valve 29$^a$ and pressure-fluid-supply means, not shown, for charging and venting cylinder 23 for actuation of the brake.

The usual return spring 30 is provided for disengaging the brake when the cylinder is vented, and the wall of the cylinder is formed with a breather hole 31 on the low-pressure side of the piston.

The piston stem 21$^a$ is internally formed as a pressure-fluid cylinder, integrally closed at its end adjacent the ball-and-socket joint 20$^a$, 22 and open at its other end.

Mounted in the stem's cylinder chamber is a stationary, elongated piston member 32 which has a reduced end portion 32$^a$ by which it is fixedly mounted upon and projects from the inner face of the cylinder-head 26, a clamping nut 33 being screwed upon a further reduced and threaded end portion of the piston member. The said piston member is centrally formed with a through fluid-conducting, inlet-outlet hole 32$^b$ which is coupled at the outer end of the piston member to a flexible pipe or hose 34 leading to it from a three-way control valve 34$^a$ and pressure-fluid-supply means, not shown, for charging and venting the piston-stem 21$^a$ as a cylinder, independently of actuation of the primary piston 21 by fluid conducted through the pipe 29. Near its open end the inner wall of the piston-stem cylinder is slidably sealed to the piston member 32 by suitable means such as an O-seal ring or "soft packing" ring 35 set in a groove in the cylinder wall, and the large piston 21 at its outer margin is slidably sealed to the cylinder-wall by a piston-packing 21$^b$.

In ordinary braking, the cylinder 23 is charged by fluid, preferably compressed air, supplied through the pipe 29.

In case of emergency, as upon failure of the air supply or in case braking pressure additional to that provided by the air is desired, a fluid, preferably an incompressible brake-actuating liquid, for quick and positive action, is forced at high pressure through the pipe 34 and the pistons' hole 32$^b$. Such high-pressure fluid exerts its pressure between the closed end of the piston-stem-cylinder 21$^a$ and the fixed piston 32 and thus urges the piston 21 and its stem 21$^a$ to the left, Fig. 3, compressing the return spring 30 and applying the brake, or supplementing the brake-applying force of the large piston 21 in case the latter is being actuated at the same time by fluid supplied through the pipe 29.

The ball-and-socket connection between the piston-stem 21$^a$ and the clevis 19 permits the angular movement of the rocker-arm 18 and also compensates for possible imperfect alignment of the cylinder assembly without excessive cramping of the pistons in their cylinders.

The secondary piston 32, slidably fitting throughout its length to its cylinder-wall, provides a long slide bearing for maintaining alignment of the pistons in relation to their cylinders.

Modifications are possible without departure from the scope of the invention as defined in the appended claims.

I claim:

1. A pressure fluid cylinder assembly for use with a vehicle having an axle structure, a wheel brake associated therewith and a brake-actuating mechanism mounted upon said axle structure, said assembly comprising a primary pressure-fluid cylinder mounted upon said axle structure, and a primary piston in said cylinder for actuation of the brake by said piston, said piston being internally formed with a secondary pressure-fluid cylinder chamber open toward a cylinder-head of the said primary cylinder, a secondary piston fixedly mounted upon the said cylinder-head and projecting into the said secondary cylinder chamber, respective means slidably sealing the said pistons to their cylinder-walls, and separate pressure-fluid supplying and venting means, each operable independently of the operation of the other, and including respective conduits in direct communication with and individual to the respective chambers, for charging and venting, through the respective one of the said conduits, the primary-cylinder chamber and the secondary-cylinder chamber, the said primary piston comprising a short piston body and a longer stem extending from said body in the direction of the power stroke and having the secondary cylinder chamber extending into it, and the said primary piston having long-span slide-bearing contact with the said secondary piston, the span of said contact being, in the direction of movement, at all times substantially coextensive with the current overlap of the secondary cylinder wall upon the secondary piston.

2. A cylinder-and-piston assembly comprising a primary pressure-fluid cylinder, a primary piston in said cylinder, said piston being internally formed with a secondary pressure-fluid cylinder chamber open toward a cylinder-head of the said primary cylinder, a secondary piston fixedly mounted upon the said cylinder-head and projecting into the said secondary cylinder chamber, respective means slidably sealing the said pistons to their cylinder walls, and separate pressure-fluid supplying and venting means, each operable independently of the other and including respective conduits in direct communication with and individual to the respective chambers, for charging and venting, through the respective one of the said conduits, the primary cylinder chamber and the secondary cylinder chamber, the said primary piston comprising a short piston body and a longer stem extending from said body in the direction of pressure-fluid actuation of the primary piston, and the said primary piston having long-span slide-bearing contact with the said secondary piston, the said secondary piston being slidably fitted to its cylinder wall substantially throughout their maximum length of overlap.

3. A cylinder-and-piston assembly comprising a primary pressure-fluid cylinder, a primary piston in said cylinder, said piston being internally formed with a secondary pressure-fluid cylinder chamber open toward a cylinder-head of the said primary cylinder, a secondary piston fixedly mounted upon the said cylinder-head and projecting into the said secondary cylinder-chamber, respective means slidably sealing the said pistons to their cylinder walls, and separate valve means for supplying and venting each chamber independently of the other.

4. An assembly as defined in claim 3 in which the primary piston rigidly comprises a short piston body and a longer stem extending from said body in the direction of pressure-fluid actuation of the primary piston, the rigid primary piston structure having long-span slide-bearing contact with the structure which comprises the primary cylinder and the secondary piston.

References Cited in the file of this patent

UNITED STATES PATENTS

| | | |
|---|---|---|
| 549,800 | Lipkowski | Nov. 12, 1895 |
| 1,711,118 | La Brie | Apr. 30, 1929 |
| 1,819,846 | Sanford | Aug. 18, 1931 |
| 1,914,986 | Tuttle et al. | June 20, 1933 |
| 2,633,712 | Sheppard | Apr. 7, 1953 |
| 2,726,738 | Fawick | Dec. 13, 1955 |
| 2,759,568 | Fawick | Aug. 21, 1956 |